May 25, 1937.  J. G. TOMPKINS  2,081,469
HOSE SUPPORTER
Filed Oct. 26, 1934
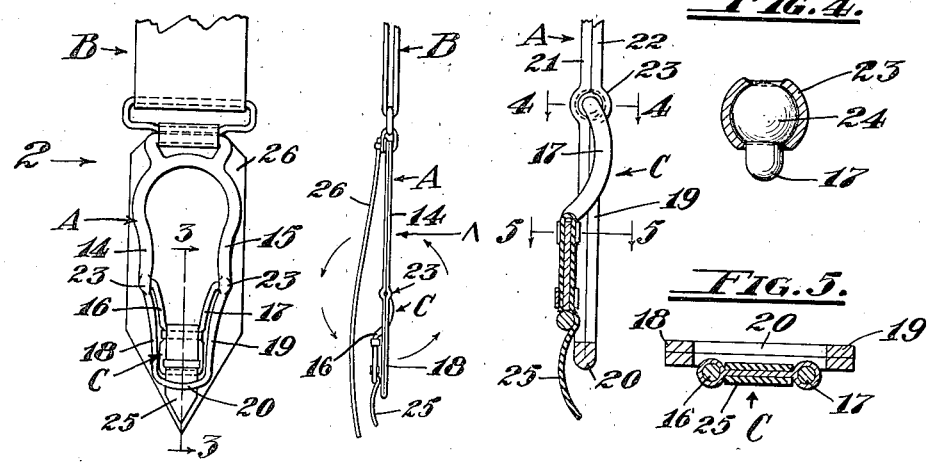
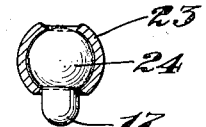
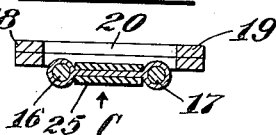
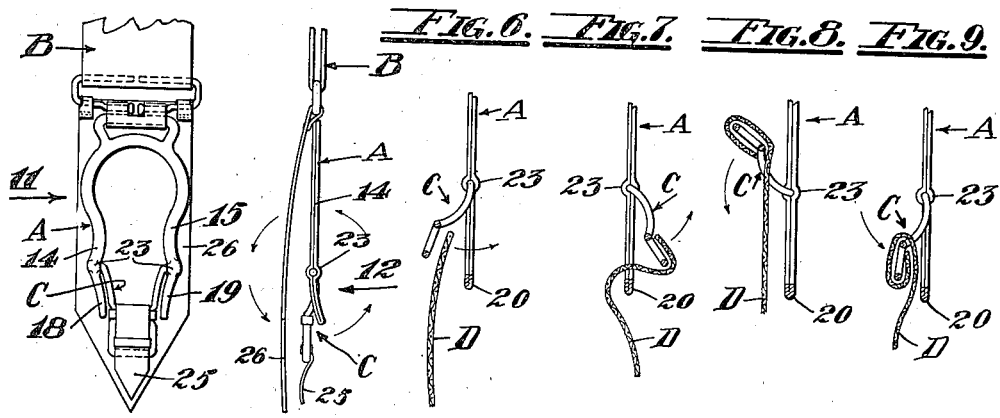
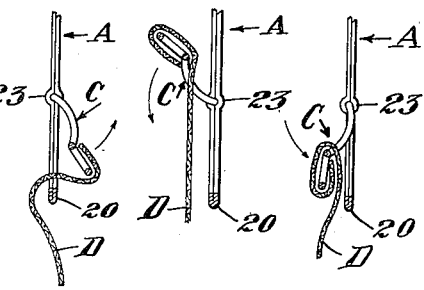
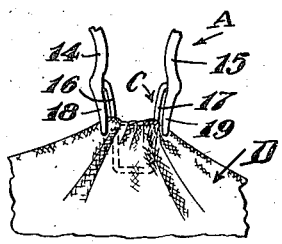
Inventor
James G. Tompkins.
By R. S. Berry
Attorney Patented May 25, 1937

2,081,469

UNITED STATES PATENT OFFICE 2,081,469

HOSE SUPPORTER

James G. Tompkins, Los Angeles, Calif.

Application October 26, 1934, Serial No. 750,159

4 Claims. (Cl. 24—243)

This invention relates to a hose supporter and particularly pertains to the type of hose supporter embodying a pair of pivotally connected supporting and fastening yokes, arranged with the fastening yoke depending from the other, and with the open ends of the yokes presented toward each other, and in which the dependent fastening yoke is adapted to be swung through the supporting yoke and turned either a complete or a partial revolution around its axis in such manner as to effect wrapping of a portion of a piece of fabric of a hose around the connected end portion of the fastening yoke; the invention more especially pertaining to improvements in the construction of hose supporters of the character set forth in my co-pending applications for United States Letters Patent Serial Numbers 693,603; 693,605; 750,157, and 750,158, and also set forth in Reissued Patent Number 19,930 of April 14, 1936.

An object of the present invention is to provide a construction in a hose supporter of the above character which will facilitate initially positioning the upper edge of a hose in readiness to be engaged by the fastening yoke, and which will also serve as a shield to overlie the fabric when wound on the fastening member and then act to minimize the possibility of the fabric slipping from its wound position on the fastening yoke.

With the foregoing object in view, together with such other objects and advantages as may subsequently appear, the invention resides in the parts, and in the combination, construction, arrangement of the parts, hereinafter described and claimed, and illustrated by way of example in the accompanying drawing in which:

Fig. 1 is a view of the hose supporter as seen in front elevation:

Fig. 2 is a view of the hose supporter as seen in end elevation in the direction indicated by the arrow 2 in Fig. 1:

Fig. 3 is a detail in vertical section taken on the line 3—3 of Fig. 1 as seen in the direction indicated by the arrows:

Fig. 4 is a view in horizontal section taken on the line 4—4 of Fig. 3:

Fig. 5 is a view in horizontal section as seen on the line 5—5 of Fig. 3:

Figs. 6, 7, 8, and 9 are diagrams in vertical section on a plane similar to that shown in Fig. 3 depicting the parts in various positions assumed in effecting engagement of a hose or fabric therewith.

Fig. 10 is a view in front elevation illustrating a modified form of the hose supporter shown in Fig. 1:

Fig. 11 is a view in side elevation as seen in the direction indicated by the arrow 11 in Fig. 10:

Fig. 12 is a detail in elevation viewed in the direction of the arrow 12 in Fig. 11 showing a hose or fabric as engaged by the supporter.

Referring to the drawing more specifically A indicates generally a supporting yoke the closed end of which is attached to an elastic strip B or other suitable member of a garter, belt, girdle, corset or the like, and C designates generally a fastening yoke which has its open end pivotally connected to the open end of the yoke A and which fastening yoke is mounted and arranged so that it may be swung completely around its axis and passed through the yoke B. The fastening yoke C is designed to be normally disposed in a pending position relative to the yoke A with its side members extending substantially on a plane with the side members of the latter as particularly shown in Figs. 2, 3, and 11.

The supporting yoke A is constructed to provide a pair of side members 14 and 15 to which the ends of the side members 16 and 17 of the fastening yoke C may be pivotally connected from the inner contiguous faces thereof; the side members 14 and 15 being spaced apart a sufficient distance and being of such length as to permit swinging of the fastening yoke upwardly through the upper portion of the supporting yoke.

The essence of the present invention resides in forming the supporting yoke A with its side members 14 and 15 having extensions 18 and 19 projecting alongside the side members 16 and 17 of the fastening yoke C when the latter is disposed in its dependent position; the extensions 18 and 19 being formed by doubling metal upon itself so as to provide the bight portions 20 at their lower ends at a point below the lower end of the fastening yoke in the preferred construction shown in Figs. 1 to 9 inclusive, but in some instances the extensions 18 and 19 may terminate about mid-way of the fastening yoke C as shown in Figs. 10 to 12 inclusive.

The fastening member A thus formed is preferably formed of a strip of sheet metal bent upon itself at the lower end of the supporting member thus forming the latter of overlying layers 21 and 22 as particularly shown in Fig. 3.

In forming the pivotal connection between the fastening yoke C and the supporting member A the side members 14 and 15 are formed at their juncture with the extensions 18 and 19 with sockets 23 opening to the inner contiguous faces of the side members 14 and 15.

The outer ends of the side members 16 and 17 of the fastening yoke C are turned outwardly and terminate in knobs 24 which seat in the sockets 23 thus forming ball and socket connections between the open end of the fastening yoke C and its supporting member A intermediate the ends of the latter, and thus providing a pivotal connection between the fastening yoke C and its supporting member A which will permit the fastening yoke being swung completely around its axis between the side members of the yoke and its extensions.

The side members 16 and 17 of the fastening yoke C are formed on an arc projecting inwardly on a plane extending at right angles to the front of the yoke, the lower end of which arcuate portion connects with a portion extending on a plane with the front of the yoke which portion is fitted with a flexible guard 25 in the form of a flap of rubber, leather or the like extending downwardly from the closed end of the supporting yoke C and adapted to be folded over the end of the yoke when applying the latter.

A flexible shielding strip 26 is mounted at the upper end of the supporter to depend downwardly over the back thereof so as to extend between supporter and the under garments or flesh of the wearer.

In the application and operation of the invention the hose supporter is disposed with the fastening yoke C depending from the supporting yoke A as shown in Figs. 2, 3, and 11.

In effecting its initial engagement with the upper margin of the hose the fastening member C is swung rearwardly and upwardly a short distance as shown in Fig. 6 whereupon the upper edge of the hose or fabric D is inserted between the extension members 18 and 19 of the supporting yoke and the front face of the lower portion of the fastening yoke whereupon the fastening yoke is swung forwardly and upwardly between the extension members 18 and 19 with a portion of the fabric of the hose astride thereof as shown in Fig. 7. The fastening yoke is then advanced upwardly and carried rearwardly through the upper portion of the supporting yoke, that is, between the side members 14 and 15, as shown in Fig. 8, and is then brought downwardly to its initial depending position whereupon a portion of the fabric will be extended through the fastening yoke and on being pulled downwardly, or the supporting yoke being pulled upwardly, the portion of the hose extending alongside the fastening yoke will overlie a portion of the fabric engaged over the end of the fastening yoke thus effecting such engagement with the fabric that a pull on the latter away from the fastening yoke will tend to more tightly effect connection between the fabric and the yoke.

During this wrapping action the shield 25 will be wrapped around the lower end of the fastening yoke and will extend between the fabric and the yoke which is preferably formed of enameled wire.

When the fabric is thus engaged by the fastening yoke, the upper portion of the fabric extending in front of the fastening yoke will be overlapped by the downwardly projecting extension members 18 and 19 of the supporting yoke, as particularly shown in Figs. 9 and 12, which extensions will then effect a clamping action on the fabric such as to resist its being pulled loose from the fastening yoke.

By provision of the extensions of the supporting yoke the initial positioning of the fabric in proper overlapped relation with the fastening yoke will be facilitated, since on swinging the fastening yoke rearwardly, as shown in Fig. 6, the extensions of the supporting member will serve as a stop for the upper edge of the fabric and thus facilitate proper positioning of the latter in overlapped relation to the supporting yoke.

I claim:

1. In a hose supporter, a hose engaging yoke, a support having spaced supporting members on which the open end of said yoke is pivoted to swing between and to opposite sides of said supporting members and be revolved around its axis to wind a fabric thereon, and abutment means on said support extending alongside of said yoke when the latter is in a depending position adapted to limit the extent of overlap of the fabric over the depending fastening yoke.

2. In a hose supporter, a supporting member having spaced supporting members, a fastening yoke having its open end pivotally connected to said supporting members to swing between and to opposite sides of said supporting members and to swing around the axis of its pivotal mounting to wrap a fabric thereon, and extensions on said supporting member protruding on opposite sides of said fastening yoke when the latter is in a depending position.

3. In a hose supporter, a supporting yoke having spaced side members, a fastening yoke pivoted at its ends between the side members of said supporting yoke to swing therebetween and to opposite sides thereof and adapted to be disposed in a depending position from said supporting yoke, and extensions on the side members of said supporting yoke arranged to project along the opposite side edges of the fastening yoke when the latter is in a depending position.

4. In a hose supporter, a supporting member having spaced side members formed by doubling metal upon itself forming a bight portion at their lower ends, and a hose engaging yoke having outturned end portions pivotally connected to said side members intermediate their ends; said hose engaging yoke being adapted to swing completely around its axis between said side members past said bight portion.

JAMES G. TOMPKINS.